US011041084B2

(12) United States Patent
Yan et al.

(10) Patent No.: US 11,041,084 B2
(45) Date of Patent: Jun. 22, 2021

(54) FINISHING METHOD FOR REACTIVE DYE INKJET PRINTING BASED ON THE CATIONIC MODIFIER INK

(71) Applicant: DONGHUA UNIVERSITY, Shanghai (CN)

(72) Inventors: Kelu Yan, Shanghai (CN); Lei Wang, Shanghai (CN)

(73) Assignee: DONGHUA UNIVERSITY, Shanghai (CN)

( * ) Notice: Subject to any disclaimer, the term of this patent is extended or adjusted under 35 U.S.C. 154(b) by 0 days.

(21) Appl. No.: 16/758,049

(22) PCT Filed: Nov. 2, 2018

(86) PCT No.: PCT/CN2018/113631
§ 371 (c)(1),
(2) Date: Apr. 22, 2020

(87) PCT Pub. No.: WO2019/214186
PCT Pub. Date: Nov. 14, 2019

(65) Prior Publication Data
US 2020/0317943 A1 Oct. 8, 2020

(30) Foreign Application Priority Data
May 10, 2018 (CN) .......................... 201810441581.0

(51) Int. Cl.
C09D 11/38 (2014.01)
B41M 5/00 (2006.01)
(Continued)

(52) U.S. Cl.
CPC ........... C09D 11/38 (2013.01); B41M 5/0023 (2013.01); B41M 5/0047 (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227; B41M 17/009; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326;
(Continued)

(56) References Cited

U.S. PATENT DOCUMENTS 5,221,288 A * 6/1993 Kamada .................. D06P 1/0048/490
6,838,498 B1 * 1/2005 Bagwell .................... D06P 5/30524/211
(Continued)

FOREIGN PATENT DOCUMENTS

CN 1393597 A 1/2003
CN 1415035 A 4/2003
(Continued)

OTHER PUBLICATIONS

M.Kanik, et al., "Affects of cationic modification on the performance on cotton fabrics inkjet printing", Foreign Textile Technology, 2004 vol. 9, 23-27.

Primary Examiner — Manish S Shah
(74) Attorney, Agent, or Firm — Bayramoglu Law Offices LLC

(57) ABSTRACT

A finishing method for reactive dye inkjet printing based on a cationic modifier includes: using the inkjet printing method to spray print the cationic modifier ink and the reactive dye ink on the cellulose fiber fabrics' pattern area after being subjected to sizing treatment, then subjecting the fabrics to steaming or baking treatment, and subjecting the fabrics to soaping to get the reactive dye inkjet printing fabrics. The timespan of spray printing the cationic modifier ink and reactive dye ink is 0-2 min. Cationic modifier ink includes 1.0-60.0 wt % cationic modifier. The cationic modifier refers to the molecular whose structure contains reactive group and positive charge group and the number average molecular weight of 100-30000. The reactive group is one or more in the group containing epoxy group, triazine, pyridine, and olefin. The positive charge group is one or more in the group containing quaternary ammonium salt, and ammonium chloride.

9 Claims, No Drawings

(51) Int. Cl.
| | |
|---|---|
| *B41M 7/00* | (2006.01) |
| *C09D 11/328* | (2014.01) |
| *D06M 13/148* | (2006.01) |
| *D06M 13/432* | (2006.01) |
| *D06M 15/11* | (2006.01) |
| *D06M 15/13* | (2006.01) |
| *D06P 1/38* | (2006.01) |
| *D06P 3/66* | (2006.01) |
| *D06P 5/22* | (2006.01) |
| *D06P 5/30* | (2006.01) |
| *D06M 101/06* | (2006.01) |

(52) U.S. Cl.
CPC .......... *B41M 7/009* (2013.01); *C09D 11/328* (2013.01); *D06M 13/148* (2013.01); *D06M 13/432* (2013.01); *D06M 15/11* (2013.01); *D06M 15/13* (2013.01); *D06P 1/38* (2013.01); *D06P 3/66* (2013.01); *D06P 5/225* (2013.01); *D06P 5/30* (2013.01); *D06M 2101/06* (2013.01)

(58) Field of Classification Search
CPC ..... C09D 11/107; C09D 11/03; C09D 11/037; C09D 11/033; D06P 5/225; D06P 5/30; D06P 1/38; D06P 3/66; D06M 15/13; D06M 13/148; D06M 13/432; D06M 15/11; D06M 2101/06
See application file for complete search history.

(56) References Cited

U.S. PATENT DOCUMENTS

| | | | |
|---|---|---|---|
| 2006/0246263 A1* | 11/2006 | Yahiaoui | B41M 5/5281 428/195.1 |
| 2010/0265294 A1* | 10/2010 | Yamada | C09D 11/328 347/21 |
| 2012/0088113 A1* | 4/2012 | Heller | D06P 3/66 428/533 |
| 2017/0284019 A1* | 10/2017 | McBride | B32B 5/245 |
| 2017/0334227 A1* | 11/2017 | Greene | B41M 5/035 |
| 2018/0311988 A1* | 11/2018 | Ito | B41M 5/0017 |
| 2019/0031899 A1* | 1/2019 | Oki | C09D 11/54 |

FOREIGN PATENT DOCUMENTS

| | | |
|---|---|---|
| CN | 103952931 A | 7/2014 |
| EP | 0710740 A1 | 5/1996 |
| KR | 20020069318 A | 8/2002 |

* cited by examiner

FINISHING METHOD FOR REACTIVE DYE INKJET PRINTING BASED ON THE CATIONIC MODIFIER INK

CROSS REFERENCE TO THE RELATED APPLICATIONS

This application is the national phase entry of International Application No. PCT/CN2018/113631, filed on Nov. 2, 2018, which is based upon and claims priority to Chinese Patent Application No. 201810441581.0, filed on May 10, 2018, the entire contents of which are incorporated herein by reference.

TECHNICAL FIELD

This invention belongs to ink jet printing field, and it relates to a finishing method for reactive dye ink jet printing based on the cationic modifier ink.

BACKGROUND

Cotton fabrics have many excellent features such as comfortability, hygroscopicity, heat preservation, permeability, and easy cleaning. Ink jet printing as a new printing method, has good features including eco-friendly, excellent adaptation, and wide range of uses. However, ink jet printing on cotton fabrics often uses reactive dye ink, and the reactive dye will easily occur hydrolysis during the steaming treatment, which can cause pollution to the environment due to the abundant hydrolysis wastes in the wastewater of washing treatment.

In order to reduce the hydrolysis dye content in the wastewater of the reactive dye printing, it is common to perform cationic modifying to the cotton fabrics to improve the colour fixing rate of the reactive dyes. However, performing this cationic modifying method to reactive dye ink jet printing will cost long time and high energy consumption. The detailed two-step procedure is, first attach the cationic modifier and sodium hydroxide to the cotton fabrics by dip-padding process, get the cationic cotton fabrics after baking and washing and drying treatment; then attach the sodium bicarbonate, urea and paste to the cationic cotton fabrics by dip-padding process, then perform drying treatment; ink jet print the reactive dye ink on to the obtained fabrics, finally get the ink jet printed fabrics after performing the steaming treatment to fixation. In the two-step procedure, though cationic modifier and the reactive dye will have reaction with the hydroxy on the cotton fabrics, the corresponding cationization and fixation of reactive dye occur step by step, and the two process don't have competition with each other for the hydroxy on the cotton fabrics. So far, the reactive dye ink jet printing method on cotton fabrics subjected to the cationization two-step method have high dye fixation, whereas the cationization two-step method takes a long time and costs much energy and water resources, which is not helpful for industrial production. So far, there haven't been any public researches on the cationic modifier ink.

Thus, it is utterly important to research and develop a finishing method with simple technical process, low energy consumption, and good finishing effect.

SUMMARY

The primary object of this invention is to overcome the existing defects of the present technology, and provide a finishing method for the reactive dye ink jet print based on the cationic modifier ink which has simple technical process, low energy consumption and good finishing effect. The finishing method for reactive dye ink jet printing based on the cationic modifier in this invention refers to a finishing method for the ink jet printing that uses cationic one-step method to meet the requirement of dye fixation and the K/S value. The cationic one-step method saves time, help shorten the technical process, and save much water and energy. Also, the K/S value and the dye fixation of the fabrics after finishing equals to or better than the cationic two-step method.

Accordingly, to achieve above mentioned objects, the present invention provides technical solutions including:

A finishing method for reactive dye ink jet printing based on the cationic modifier ink, which uses the ink jet printing method to ink jet print the cationic modifier ink and reactive dye ink onto the cellulose fiber after being subjected to sizing treatment, and then perform steaming or baking treatment, finally perform soaping and obtain the reactive dye ink jet print fabrics.

The ink jet print timespan of the cationic modifier ink and the reactive dye ink is 0-2 min. The timespan occurs due to the different types of the ink jet printer and the ways of ink jet printing. Shorter the timespan is, better the ink jet print would be. Long timespan will affect the production efficiency.

The cationic modifier ink refers to the ink containing 1.0-60.0 wt % cationic modifier. The cationic ink in this concentration range will have good performance in stability and the fluency of the ink jet printing. If the concentration of the cationic modifier is too low, the cationic modifier won't take effect. If the concentration of the cationic modifier is too high, the ink made from the cationic modifier will get worse in stability and ink jet printing fluency.

The cationic modifier refers to the molecule containing reactive group and the positive charge group, and the number average molecular weight is 100-30000. The reactive group is one or more in the group containing epoxy group, triazine, pyridine, and olefin. The positive charge group is one or more in the group containing quaternary ammonium salt, and ammonium chloride.

As a preferred a technical solution:

The finishing method as mentioned above, the treatment process of cellulose fiber fabrics being sized is: perform the sizing treatment to the fabrics by dip-padding process, and ensure the liquid content in the fabrics is 60-100 wt %, finally obtain the cellulose fiber fabrics being sized after drying. The mentioned cellulose fiber fabrics include cotton fabrics, bast, viscose, tenel, and modal fiber. The cellulose fiber fabrics in this invention include but not limited to these, these are just some common cellulose fiber fabrics.

The finishing method as mentioned above, the sizing agent in the sizing treatment includes 1.0-10.0 wt % base agent, 1.0-10.0 wt % thickener, 1.0-40.0 wt % hygroscopic agent and deionized water as allowance.

The base agent is chosen one or mixture from the group consisting of sodium hydroxide, sodium bicarbonate, sodium carbonate.

The thickener is chosen one or a mixture from the group consisting of sodium alginate, starch, guar gum, and polyacrylic acid polymer type synthesis paste.

The hygroscopic agent is chosen one or a mixture from the group consisting of glycerol, urea, and polyethylene glycol.

The finishing method as mentioned above, wherein the cationic modifier ink has the viscosity of 1-10 cP, and the surface tension of 30-66 mN/m. The cationic modifier ink needs to be filtered through the 0.10-0.50 μm filter membrane after being mixed uniformly according to the component proportion.

The finishing method as mentioned above, wherein the cationic modifier is base 2,3-epoxypropyltrimethylammonium chloride, 2,3-epoxypropyltriethylammonium chloride, 3-chloro-2-hydroxypropyltrimethylammonium chloride, 3-chloro-2-hydroxypropyltriethylammonium chloride, monochlorotriazine type quaternary ammonium salt compound, azetidine cation compound or choline chloride.

The finishing method as mentioned above, wherein the cationic modifier ink includes: viscosity regulator 5.0-20.0 wt %, surface tension regulator 0.1-3.0 wt %, pH regulator 0-2.0 wt %, and fungicide 0-2.0 wt %, and water as allowance.

The finishing method as mentioned above, wherein the viscosity regulator agent is chosen one or a mixture from the group consisting of glycerol, 1,2-propanediol, dimethyl sulfoxide, triethylene glycol, ethylene glycol, diethylene glycol ether, and polyethylene glycol 1000. The surface tension regulator agent is chosen one or a mixture from the group consisting of sodium dodecylsulfonate, sodium lauryl sulfate, sodium stearate, sodium laurate, cetyltrimethylammonium bromide, dodecyltrimethylammonium bromide, OP-emulsifier and tween-80.

The finishing method as mentioned above, wherein the pH regulator is chosen one or a mixture from the group consisting of hydrochloric acid, sulfuric acid, citric acid, monoethanolamine, diethanolamine, triethanolamine, dipotassium hydrogen phosphate, potassium dihydrogen phosphate, disodium hydrogen phosphate, sodium dihydrogen phosphate, sodium bicarbonate, sodium carbonate, and sodium hydroxide. The fungicide is chosen one or a mixture from the group consisting of benzoic acid, potassium sorbate, dehydroacetic acid and sodium lactate. The pH regulators introduced in this invention are the common examples, and the pH regulators suitable for this invention are not limited to these.

The finishing method as mentioned above, wherein the reactive dye in the reactive dye ink is monochlorotriazine, dichlorotriazine or vinylsulfone type reactive dye, and the reactive dye has the weight percentage of 5.0-20.0%.

The finishing method as mentioned above, wherein the steaming treatment refers to steaming with 100-180° C. saturated steam for 1-30 min. the baking treatment refers to baking at 100-180° C. for 6-30 min. The temperature and the time are set in this range is to ensure the reaction between the cationic modifier, the reactive dye and the cotton fabrics. Either high temperature or the long time will cause the break of the covalent bond formed due to the reactive dye and the cotton fabrics, which will lead to the decrease of K/S value and dye fixation. Either low temperature or the short time will have negative influence on the reaction between the reactive dye and the cotton fabrics, which will lead to low K/S value and low dye fixation.

Invention Mechanism:

This invention for the first time improves the reactive dye ink jet printing performance by ink jet printing the cationic modifier ink. This technical method combines the cationization and the fixation of the reactive dye into one step, which largely shortens the technological process, and saves the energy. This technical method (or for short, one-step method) has a different chemical reaction process compared to the two-step method in which the fabrics are firstly subjected to cationization and ink jet print the reactive dye. In two-step method, cotton fabrics are firstly modified by the cationic modifier and obtain the cationic cotton fabrics, then ink jet print the reactive dye ink, and the reactive dye attaches and fixes to the cationic cotton fabrics during the steaming treatment. The cationization of the cotton fabrics and the fixation of the reactive dye are two separate steps, though the cationic modifier and the reactive dye will have chemical reaction with the hydroxy on the cotton fabrics, the corresponding cationization and the fixation take place in a sequence. Thus, the two steps don't have competition between each other. Whereas in this one-step cationic modifying and reactive dye ink jet printing technical method in this invention, the cationization and the fixation of the reactive dye are combined as one step and they take place at the same time. Both cationic modifier and the reactive dye will have chemical reaction with the hydroxy on the cotton fabrics, thus they have competition relationship between each other. In order to examine the reaction process between the cationic modifier and the cotton fabrics and the reactive dye and the cotton fabrics, this invention uses gaussian program to calculate the reaction thermodynamics data and the kinetics data between the cationic modifier and the cotton fabrics, and that between the reactive dye and cotton fabrics. The drawing below shows the reactants R1, R2, R3, transition state TS1, TS2, and the reaction process for the products P1, P2.

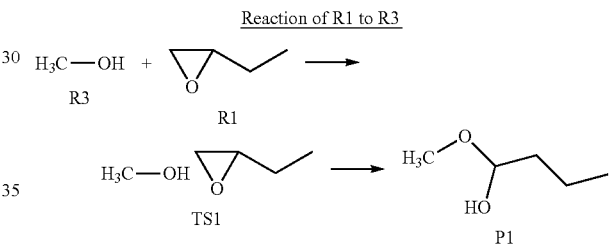

Reaction of R1 to R3

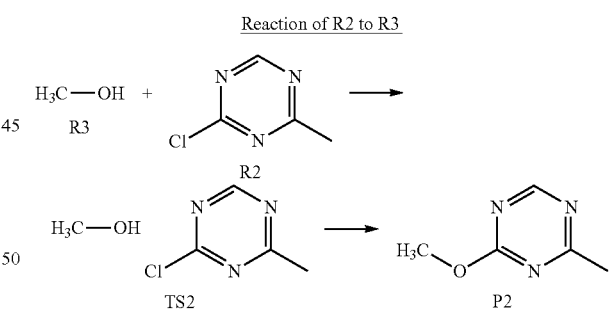

Reaction of R2 to R3

In the reaction formula, R1 refer to the cationic modifier, R2 refer to the reactive dye, R3 refer to the cotton fabrics, wherein TS1 and TS2 respectively refer to different transition state of the reaction, P1 and P2 refer to the reaction products. Towards the reaction of the R1 and R3, gaussian calculation results show that the C—O bond increases from the 1.49 Å in reactant R3 to the 2.10 Å in transition state TS1, O—H bond increases from the 0.98 Å in reactant R3 to 1.05 Å in transition state TS1. The newly generated C—O bond decreases from 2.21 Å in transition state TS1 to 1.45 Å in reaction products P1, and the newly generated O—H bond decreases from 1.49 Å in the transition state TS1 to the 0.98 Å in the reaction products P1. Thus, towards the reaction R1 and R3, the reaction mechanism is the oxygen atoms in R3 attack carbon atoms connected to the oxygen but without branched chain in R1, and nucleophilic reaction takes place, then obtain reaction products P1. To the reaction R2 and R3, gaussian calculation results show that the C—Cl increases from the 1.80 Å in reactant R2 to 2.22 Å in the transition state TS2, the O—H bond increases from the 0.98 Å in the reactant R3 to the 1.02 Å in the transition state TS2. The newly generated C—O bond decreases from the 1.68 Å in the transition state TS2 to the 1.35 Å in the reaction products P2. Thus, to the reaction R2 and R3, the reaction mechanism is that the oxygen atom in R3 attacks the carbon atoms connected to the chlorine in R2, and nucleophilic reaction takes place, then obtain the reaction products P2. Use b31yp/6-31g to process the data and get the data of the reaction thermodynamics and kinetics. The result is shown in the table below:

|  | ΔH (KJ · mol-1) | ΔG (KJ · mol-1) | Ea (KJ · mol-1) |
| --- | --- | --- | --- |
| R1 + R3→P1 | −121.6814 | −74.1205 | 125.7208 |
| R2 + R3→P2 | −69.9570 | −53.6521 | 172.1007 |

It shows that the reaction enthalpy (ΔH) between R1 and R3 is −121.6814 KJ·mol$^{-1}$, the reaction enthalpy (ΔH) between R2 and R3 is −69.9570 KJ·mol$^{-1}$. Compared to the reaction between R2 and R3, the reaction between R1 and R3 releases more heat. When Gibbs Free Energy (ΔG) is negative, it means the chemical reaction can carry out by itself. Compared to the Gibbs Free Energy −53.6521 KJ·mol$^{-1}$ in the reaction of R2 and R3, the Gibbs Free Energy in the reaction of R1 and R3 is −74.1205 KJ·mol$^{-1}$, smaller the negative value is, more easily the reaction will take place. The reaction activation energy (Ea) of R1 and R3 is 125.7208 KJ·mol$^{-1}$, and the reaction activation energy (Ea) of R2 and R3 is 172.1007 KJ·mol$^{-1}$. The lower the reaction activation energy, the easier it is for the chemical reaction to proceed.

As put forward, the technological process and the reaction mechanism of the one-step method and that of the two-step method are different. In one-step method, because the reactivity of the cationic modifier and the cotton fabrics is stronger than the reactivity of reactive dye and cotton fabrics, the cationic modifier will be the first to have reaction with cotton fabrics. With the progress of reaction, zeta potential of the fabrics slowly alters from negative to positive, so the reactive dye with the negative electricity will be attracted to the fabrics and attach to the fabrics and fix the colour to the fabrics.

Benefits:

1. A finishing method for reactive dye ink jet printing based on the cationic modifier ink in this invention, wherein the cationization of the cotton fabrics and the fixation of the reactive dye are combined into one step. This largely shortens the technological process and improves the K/S value and the dye fixation.

2. A finishing method for reactive dye ink jet printing based on the cationic modifier ink in this invention, wherein the cationization is only performed in the area that has patterns and graphs. This prevents the hydrolysed dye causing stains during the washing treatment, ensures the contour finish of the patterns, and reduces the amount of cationic modifier used in the process and cuts down the cost.

DETAILED DESCRIPTION OF THE EMBODIMENTS

Hereinafter, the present invention will be described in more detail by the following examples. It should be noticed that these examples are only for illustrating the present invention and are not intended to limit the scope of the present invention. In addition, it should be noticed that after reading the content of the present invention, those skilled in this field can make various modifications or changes to the present invention, and these equivalent forms also apply to the scope of the appended claims of this application.

Example 1

A finishing method for reactive dye ink jet printing based on the cationic modifier ink, comprising the steps:

(1) Preparing the sizing agent;

In the total weight of the sizing agent, the sizing agent comprises 2.0 wt % sodium bicarbonate, 2.0 wt % sodium alginate, 5.0 wt % urea and deionized water as allowance.

(2) Perform sizing treatment to the cellulose fiber fabrics;

Perform sizing treatment to the fabrics by dip-padding process, make sure the liquid content in the fabrics is 80 wt %. Obtain the cellulose fiber fabrics subjected to the sizing treatment, wherein the cellulose fiber fabrics is cotton fabrics.

(3) Prepare the cationic modifier ink and the reactive dye ink;

In the total weight of the cationic modifier ink, the cationic modifier ink comprises 5.0 wt % 3-chloro-2-hydroxypropyltrimethylammonium chloride, 10.0 wt % ethylene glycol, 3.0 wt % glycerol, 0.2 wt % tween-80, 0.1 wt % triethanolamine, 0.1 wt % sodium sorbate, and water as allowance. Uniformly mix these components according to the proportion given above, and filter through the 0.22 μm filter membrane, and obtain the cationic modifier ink. The viscosity of the obtained cationic modifier ink is 3.5 cP, and the surface tension is 50 mN/m.

The reactive dye used in the reactive dye ink is monochlorotriazine reactive dye, wherein the weight percentage of the reactive dye is 10%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 1 min.

(5) Obtain the reactive dye ink jet printed fabrics after baking treatment and soaping. Wherein the baking treatment refers to perform baking treatment at 115° C. for 10 min. The soaping treatment includes 5 steps: 1) washing at room temperature for 1 min; 2) washing with 50° C. water for 1 min; 3) soaping with the 2 g/L soaping agent D-301 at 98° C. for 5 min; 4) washing with 50° C. water for 5 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 14.8, the dry rubbing fastness of level 5, and the wet rubbing fastness of level 3-4.

Comparative Example 1

A finishing method for reactive dye ink jet printing whose steps are basically the same as those in example 1. The differences are, step (3) doesn't prepare cationic modifier ink and step (4) doesn't ink jet print the cationic modifier ink. The obtained ink jet printed fabrics have K/S value of 11.9, the dry fastness of level 4, and the wet fastness of level 3. Compare example 1 and comparative example 1, using reactive dye ink jet print method based on the cationic modifier ink can significantly improve the K/S value of the reactive dye ink jet printed fabrics. This method also combines the cationization and the fixation of the reactive dye into one step, which significantly shortens the technological procedure and saves the energy. We can tell form the comparison between rubbing fastness of example 1 and comparative example 1 that the ink jet printed fabrics obtained in this invention has the dry rubbing fastness of level 4-5, wet rubbing fastness of level 3 or higher level. It can be told that, the ink jet printed cotton fabrics using the method in this invention can reach a high level of both dry and wet rubbing fastness.

Example 2

A finishing method for reactive dye ink jet printing based on the cationic modifier ink, comprising the steps:

(1) Preparing the sizing agent;

In the total weight of the sizing agent, the sizing agent comprises 2.5 wt % sodium bicarbonate, 3.0 wt % sodium alginate, 10.0 wt % urea and deionized water as allowance.

(2) Perform sizing treatment to the cellulose fiber fabrics;

Perform sizing treatment to the fabrics by dip-padding process, make sure the liquid content in the fabrics is 80 wt %. Obtain the cellulose fiber fabrics subjected to the sizing treatment, wherein the cellulose fiber fabrics is cotton fabrics.

(3) Prepare the cationic modifier ink and the reactive dye ink;

In the total weight of the cationic modifier ink, the cationic modifier ink comprises 40.0 wt % 3-chloro-2-hydroxypropyltrimethylammonium chloride, 10.0 wt % ethylene glycol, 5.0 wt % glycerol, 0.25 wt % tween-80, 0.1 wt % diethanolamine, 0.1 wt % sodium sorbate, and water as allowance. Uniformly mix these components according to the proportion given above, and filter through the 0.22 μm filter membrane, and obtain the cationic modifier ink. The viscosity of the obtained cationic modifier ink is 4.2 cP, and the surface tension is 40 mN/m.

The reactive dye used in the reactive dye ink is dichlorotriazine reactive dye, wherein the weight percentage of the reactive dye is 15.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 1 min.

(5) Obtain the reactive dye ink jet printed fabrics after baking treatment and soaping. Wherein the baking treatment refers to perform baking treatment at 100° C. for 10 min. The soaping treatment includes 5 steps: 1) washing at room temperature for 1 min; 2) washing with 50° C. water for 1 min; 3) soaping with the 2 g/L soaping agent D-301 at 98° C. for 5 min; 4) washing with 50° C. water for 5 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 16.9, the dry rubbing fastness of level 5, and the wet rubbing fastness of level 4.

Example 3

A finishing method for reactive dye ink jet printing based on the cationic modifier ink, comprising the steps:

(1) Preparing the sizing agent;

In the total weight of the sizing agent, the sizing agent comprises 4.0 wt % sodium bicarbonate, 5.0 wt % sodium alginate, 15.0 wt % urea and deionized water as allowance.

(2) Perform sizing treatment to the cellulose fiber fabrics;

Perform sizing treatment to the fabrics by dip-padding process, make sure the liquid content in the fabrics is 70 wt %. Obtain the cellulose fiber fabrics subjected to the sizing treatment, wherein the cellulose fiber fabrics is cotton fabrics.

(3) Prepare the cationic modifier ink and the reactive dye ink;

In the total weight of the cationic modifier ink, the cationic modifier ink comprises 25.0 wt % 3-chloro-2-hydroxypropyltrimethylammonium chloride, 14.0 wt % ethylene glycol, 5.0 wt % glycerol, 0.25 wt % tween-80, 0.2 wt % monoethanolamine, 0.1 wt % sodium sorbate, and water as allowance. Uniformly mix these components according to the proportion given above, and filter through the 0.22 μm filter membrane, and obtain the cationic modifier ink. The viscosity of the obtained cationic modifier ink is 5 cP, and the surface tension is 55 mN/m.

The reactive dye used in the reactive dye ink is vinyl sulfone reactive dye, wherein the weight percentage of the reactive dye is 20.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 1 min.

(5) Obtain the reactive dye ink jet printed fabrics after baking treatment and soaping. Wherein the baking treatment refers to perform baking treatment at 100° C. for 10 min. The soaping treatment includes 5 steps: 1) washing at room temperature for 1 min; 2) washing with 50° C. water for 1 min; 3) soaping with the 2 g/L soaping agent D-301 at 98° C. for 5 min; 4) washing with 50° C. water for 5 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 16.9, the dry rubbing fastness of level 5, and the wet rubbing fastness of level 4.

Example 4

A finishing method for reactive dye ink jet printing based on the cationic modifier ink, comprising the steps:

(1) Preparing the sizing agent;

In the total weight of the sizing agent, the sizing agent comprises 6.0 wt % sodium bicarbonate, 5.0 wt % sodium alginate, 20.0 wt % urea and deionized water as allowance.

(2) Perform sizing treatment to the cellulose fiber fabrics;

Perform sizing treatment to the fabrics by dip-padding process, make sure the liquid content in the fabrics is 60 wt %. Obtain the cellulose fiber fabrics subjected to the sizing treatment, wherein the cellulose fiber fabrics is cotton fabrics.

(3) Prepare the cationic modifier ink and the reactive dye ink;

In the total weight of the cationic modifier ink, the cationic modifier ink comprises 20.0 wt % 3-chloro-2-hydroxypropyltrimethylammonium chloride, 10.0 wt % ethylene glycol, 4.0 wt % glycerol, 3.0 wt % tween-80, 0.1 wt % sodium carbonate, 0.1 wt % sodium sorbate, and water as allowance. Uniformly mix these components according to the proportion given above, and filter through the 0.22 μm filter membrane, and obtain the cationic modifier ink. The viscosity of the obtained cationic modifier ink is 3.6 cP, and the surface tension is 50 mN/m.

The reactive dye used in the reactive dye ink is dichloromesatriazine reactive dye, wherein the weight percentage of the reactive dye is 10.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 140° C. for 10 min. The soaping treatment includes 5 steps: 1) washing at room temperature for 1 min; 2) washing with 50° C. water for 1 min; 3) soaping with the 2 g/L soaping agent D-301 at 98° C. for 5 min; 4) washing with 50° C. water for 5 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 13.2, the dry rubbing fastness of level 5, and the wet rubbing fastness of level 3-4.

Example 5

A finishing method for reactive dye ink jet printing based on the cationic modifier ink, comprising the steps:

(1) Preparing the sizing agent;

In the total weight of the sizing agent, the sizing agent comprises 1.0 wt % sodium bicarbonate, 10.0 wt % starch, 2.0 wt % glycerol, 3.0 wt % urea, 1.0 wt % polyethylene glycol and deionized water as allowance.

(2) Perform sizing treatment to the cellulose fiber fabrics;

Perform sizing treatment to the fabrics by dip-padding process, make sure the liquid content in the fabrics is 60 wt %. Obtain the cellulose fiber fabrics subjected to the sizing treatment, wherein the cellulose fiber fabrics is cotton fabrics.

(3) Prepare the cationic modifier ink and the reactive dye ink;

In the total weight of the cationic modifier ink, the cationic modifier ink comprises 1.0 wt % 2,3-epoxypropyltrimethylammonium chloride, 5.0 wt % glycerol, 0.1 wt % sodium dodecyl sulfonate, 2.0 wt % hydrochloric acid, 2.0 wt % benzoic acid, and water as allowance. Uniformly mix these components according to the proportion given above, and filter through the 0.10 μm filter membrane, and obtain the cationic modifier ink. The viscosity of the obtained cationic modifier ink is 5.5 cP, and the surface tension is 55 mN/m.

The reactive dye used in the reactive dye ink is dichloromethanetriazine and vinyl sulfone double reactive group reactive dye, wherein the weight percentage of the reactive dye is 5.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 0 min.

(5) Obtain the reactive dye ink jet printed fabrics after baking treatment and soaping. Wherein the baking treatment refers to perform baking treatment at 150° C. for 30 min. The soaping treatment includes 5 steps: 1) washing at room temperature for 2 min; 2) washing with 50° C. water for 3 min; 3) soaping with the 2 g/L soaping agent D-301 at 97° C. for 8 min; 4) washing with 56° C. water for 4 min; 5) washing at room temperature for 4 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 9.3, the dry rubbing fastness of level 4, and the wet rubbing fastness of level 3-4.

Example 6

A finishing method for reactive dye ink jet printing based on the cationic modifier ink, comprising the steps:

(1) Preparing the sizing agent;

In the total weight of the sizing agent, the sizing agent comprises 5.0 wt % sodium carbonate, 5.0 wt % guar gum, 1.0 wt % glycerol, 1.0 wt % urea, 1.0 wt % polyethylene glycol and deionized water as allowance.

(2) Perform sizing treatment to the cellulose fiber fabrics;

Perform sizing treatment to the fabrics by dip-padding process, make sure the liquid content in the fabrics is 100 wt %. Obtain the cellulose fiber fabrics subjected to the sizing treatment, wherein the cellulose fiber fabrics are mixed by cotton, bast, and modal fabrics (mass ratio is 1:1:1).

(3) Prepare the cationic modifier ink and the reactive dye ink;

In the total weight of the cationic modifier ink, the cationic modifier ink comprises 60.0 wt % 2,3-epoxypropyltriethylammonium chloride, 10.0 wt % 1,2-propanediol, 3.0 wt % sodium lauryl sulfate, 2.0 wt % sulfuric acid, and 2.0 wt % dehydroacetic acid and water as allowance. Uniformly mix these components according to the proportion given above, and filter through the 0.50 μm filter membrane, and obtain the cationic modifier ink. The viscosity of the obtained cationic modifier ink is 6 cP, and the surface tension is 55 mN/m.

The reactive dye used in the reactive dye ink is vinyl sulfone reactive group reactive dye, wherein the weight percentage of the reactive dye is 20.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 180° C. for 6 min. The soaping treatment includes 5 steps: 1) washing at room temperature for 2 min; 2) washing with 50° C. water for 3 min; 3) soaping with the 3 g/L soaping agent D-301 at 97° C. for 8 min; 4) washing with 56° C. water for 4 min; 5) washing at room temperature for 4 min.

Use DataColor tester to test K/S value (K/S value refers to the colour strength value of the fabrics) of the cotton fabrics obtained after being subjected to these treatments.

Then test the washing fastness and the rubbing fastness. The test results show that the reactive dye ink jet printed fabrics have the K/S value of 15.1, the dry rubbing fastness of level 4-5, and the wet rubbing fastness of level 3-4.

Example 7

A finishing method for reactive dye ink jet printing based on the cationic modifier ink, comprising the steps:

(1) Preparing the sizing agent;

In the total weight of the sizing agent, the sizing agent comprises 1.0 wt % sodium bicarbonate, 1.0 wt % polyacrylic polymer type synthetic paste, 4 wt % glycerol, 4 wt % urea, 4 wt % polyethylene glycol and deionized water as allowance.

(2) Perform sizing treatment to the cellulose fiber fabrics;

Perform sizing treatment to the fabrics by dip-padding process, make sure the liquid content in the fabrics is 60 wt %. Obtain the cellulose fiber fabrics subjected to the sizing treatment, wherein the cellulose fiber fabrics are viscose fabrics.

(3) Prepare the cationic modifier ink and the reactive dye ink;

In the total weight of the cationic modifier ink, the cationic modifier ink comprises 20.0 wt % 3-chloro-2-hydroxypropyltriethylammonium chloride, 15. wt % dimethylsulfoxide, 0.8 wt % sodium stearate, 0.2 wt % citric acid, and 0.2 wt % sodium lactate and water as allowance. Uniformly mix these components according to the proportion given above, and filter through the 0.10 μm filter membrane, and obtain the cationic modifier ink. The viscosity of the obtained cationic modifier ink is 10 cP, and the surface tension is 50 mN/m.

The reactive dye used in the reactive dye ink is fluorotriazine reactive group reactive dye, wherein the weight percentage of the reactive dye is 15.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 100° C. for 18 min. The soaping treatment includes 5 steps: 1) washing at room temperature for 2 min; 2) washing with 50° C. water for 3 min; 3) soaping with the 3 g/L soaping agent D-301 at 97° C. for 8 min; 4) washing with 56° C. water for 4 min; 5) washing at room temperature for 4 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 16, the dry rubbing fastness of level 5, and the wet rubbing fastness of level 3-4.

Example 8

A finishing method for reactive dye ink jet printing based on the cationic modifier ink, comprising the steps:

(1) Preparing the sizing agent;

In the total weight of the sizing agent, the sizing agent comprises 10.0 wt % sodium carbonate, 8.0 wt % starch, 10.0 wt % glycerol, 10.0 wt % urea, 10.0 wt % polyethylene glycol and deionized water as allowance.

(2) Perform sizing treatment to the cellulose fiber fabrics;

Perform sizing treatment to the fabrics by dip-padding process, make sure the liquid content in the fabrics is 70 wt %. Obtain the cellulose fiber fabrics subjected to the sizing treatment, wherein the cellulose fiber fabrics are viscose fabrics.

(3) Prepare the cationic modifier ink and the reactive dye ink;

In the total weight of the cationic modifier ink, the cationic modifier ink comprises 1.0 wt % of 2-chloro-4,6-diamino-1,3,5-triazine, 5 wt % of triethylene glycol, 0.8 wt % of sodium laurate, 1.2 wt % of dipotassium hydrogen phosphate, 0.2 wt % dehydroacetic acid and 0.2 wt % sodium lactate and water as allowance. Uniformly mix these components according to the proportion given above, and filter through the 0.50 μm filter membrane, and obtain the cationic modifier ink. The viscosity of the obtained cationic modifier ink is 3.2 cP, and the surface tension is 30 mN/m.

The reactive dye used in the reactive dye ink is fluorotriazine reactive group reactive dye, wherein the weight percentage of the reactive dye is 8.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 130° C. for 20 min. The soaping treatment includes 5 steps: 1) washing at room temperature for 2 min; 2) washing with 50° C. water for 3 min; 3) soaping with the 3 g/L soaping agent D-301 at 97° C. for 8 min; 4) washing with 56° C. water for 4 min; 5) washing at room temperature for 4 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 12.8, the dry rubbing fastness of level 5, and the wet rubbing fastness of level 3-4.

Example 9

A finishing method for reactive dye ink jet printing based on the cationic modifier ink, comprising the steps:

(1) Preparing the sizing agent;

In the total weight of the sizing agent, the sizing agent comprises 10.0 wt % sodium carbonate, 10.0 wt % sea polyacrylic polymer synthetic paste, 5.0 wt % glycerol, 5.0 wt % urea, 5.0 wt % polyethylene glycol and deionized water as allowance.

(2) Perform sizing treatment to the cellulose fiber fabrics;

Perform sizing treatment to the fabrics by dip-padding process, make sure the liquid content in the fabrics is 60 wt %. Obtain the cellulose fiber fabrics subjected to the sizing treatment, wherein the cellulose fiber fabrics are viscose fabrics.

(3) Prepare the cationic modifier ink and the reactive dye ink;

In the total weight of the cationic modifier ink, the cationic modifier ink comprises 8.0 wt % N-dimethylazetidine chloride, 15.0 wt % ethylene glycol, 2 wt % dodecyltrimethylammonium bromide, 2.0 wt % potassium dihydrogen phosphate, 2.0 wt % potassium sorbate, 2.0 wt % dehydroacetic acid and 2.0 wt % sodium lactate and water as allowance. Uniformly mix these components according to the proportion given above, and filter through the 0.10 μm filter membrane, and obtain the cationic modifier ink. The viscosity of the obtained cationic modifier ink is 2 cP, and the surface tension is 40 mN/m.

The reactive dye used in the reactive dye ink is fluorotriazine reactive group reactive dye, wherein the weight percentage of the reactive dye is 18.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 140° C. for 10 min. The soaping treatment includes 5 steps: 1) washing at room temperature for 2 min; 2) washing with 50° C. water for 3 min; 3) soaping with the 3 g/L soaping agent D-301 at 97° C. for 8 min; 4) washing with 56° C. water for 4 min; 5) washing at room temperature for 4 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 15.3, the dry rubbing fastness of level 4-5, and the wet rubbing fastness of level 4.

Example 10

A finishing method for reactive dye ink jet printing based on the cationic modifier ink, comprising the steps:

(1) Preparing the sizing agent;

In the total weight of the sizing agent, the sizing agent comprises 10.0 wt % sodium carbonate, 3 wt % polyacrylic polymer type synthetic paste, 30.0 wt % polyethylene glycol and deionized water as allowance.

(2) Perform sizing treatment to the cellulose fiber fabrics;

Perform sizing treatment to the fabrics by dip-padding process, make sure the liquid content in the fabrics is 100 wt %. Obtain the cellulose fiber fabrics subjected to the sizing treatment, wherein the cellulose fiber fabrics are tenel fabrics.

(3) Prepare the cationic modifier ink and the reactive dye ink;

In the total weight of the cationic modifier ink, the cationic modifier ink comprises 30 wt % choline chloride, 15.0 wt % diethylene glycol ether, 0.3 wt % OP-emulsifier, 2.0 wt % disodium hydrogen phosphate, and 2.0 wt % benzoic acid and water as allowance. Uniformly mix these components according to the proportion given above, and filter through the 0.50 μm filter membrane, and obtain the cationic modifier ink. The viscosity of the obtained cationic modifier ink is 10 cP, and the surface tension is 66 mN/m.

The reactive dye used in the reactive dye ink is dichloromesatriazinereactive group reactive dye, wherein the weight percentage of the reactive dye is 20.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 0 min.

(5) Obtain the reactive dye ink jet printed fabrics after baking treatment and soaping. Wherein the baking treatment refers to perform baking treatment at 100° C. for 10 min. The soaping treatment includes 5 steps: 1) washing at room temperature for 3 min; 2) washing with 50° C. water for 4 min; 3) soaping with the 2 g/L soaping agent D-301 at 95° C. for 7 min; 4) washing with 55° C. water for 3 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 18.2, the dry rubbing fastness of level 5, and the wet rubbing fastness of level 4.

Example 11

A finishing method for reactive dye ink jet printing based on the cationic modifier ink, comprising the steps:

(1) Preparing the sizing agent;

In the total weight of the sizing agent, the sizing agent comprises 3.0 wt % sodium hydroxide, 6.0 wt % starch, 40.0 wt % polyethylene glycol and deionized water as allowance.

(2) Perform sizing treatment to the cellulose fiber fabrics;

Perform sizing treatment to the fabrics by dip-padding process, make sure the liquid content in the fabrics is 70 wt %. Obtain the cellulose fiber fabrics subjected to the sizing treatment, wherein the cellulose fiber fabrics are modal fabrics.

(3) Prepare the cationic modifier ink and the reactive dye ink;

In the total weight of the cationic modifier ink, the cationic modifier ink comprises 20.0 wt % choline chloride, 15.0 wt % polyethylene glycol 1000, 0.1 wt % OP-emulsifier, 0.1 wt % OP-emulsifier, 2.0 wt % sodium dihydrogen phosphate, and 0.2 wt % benzoic acid and water as allowance. Uniformly mix these components according to the proportion given above, and filter through the 0.10 μm filter membrane, and obtain the cationic modifier ink. The viscosity of the obtained cationic modifier ink is 1 cP, and the surface tension is 30 mN/m.

The reactive dye used in the reactive dye ink is vinyl sulfonegroup reactive dye, wherein the weight percentage of the reactive dye is 10.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 140° C. for 15 min. The soaping treatment includes 5 steps: 1) washing at room temperature for 3 min; 2) washing with 50° C. water for 4 min; 3) soaping with the 2 g/L soaping agent D-301 at 95° C. for 7 min; 4) washing with 55° C. water for 3 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 13.0, the dry rubbing fastness of level 4-5, and the wet rubbing fastness of level 3-4.

Example 12

A finishing method for reactive dye ink jet printing based on the cationic modifier ink, comprising the steps:

(1) Preparing the sizing agent;

In the total weight of the sizing agent, the sizing agent comprises 5.0 wt % sodium carbonate, 6.0 wt % sodium alginate, 18.0 wt % urea and deionized water as allowance.

(2) Perform sizing treatment to the cellulose fiber fabrics;

Perform sizing treatment to the fabrics by dip-padding process, make sure the liquid content in the fabrics is 80 wt %. Obtain the cellulose fiber fabrics subjected to the sizing treatment, wherein the cellulose fiber fabrics are mixed by cotton, and bast (mass ratio is 1:1).

(3) Prepare the cationic modifier ink and the reactive dye ink;

In the total weight of the cationic modifier ink, the cationic modifier ink comprises 10.0 wt % 3-chloro-2-hydroxypropyltriethylammonium chloride, 5.0 wt % glycerol, 5.0 wt % 1,2-propanediol, 5.0 wt % dimethylsulfoxide, 0.1 wt % tween-80, 0.2 wt % sodium bicarbonate and 0.3 wt % potassium sorbate and water as allowance. Uniformly mix these components according to the proportion given above, and filter through the 0.50 μm filter membrane, and obtain the cationic modifier ink. The viscosity of the obtained cationic modifier ink is 5.2 cP, and the surface tension is 35 mN/m.

The reactive dye used in the reactive dye ink is monochlorotriazine reactive dye, wherein the weight percentage of the reactive dye is 5.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 140° C. for 30 min. The soaping treatment includes 5 steps: 1) washing at room temperature for 3 min; 2) washing with 50° C. water for 4 min; 3) soaping with the 2 g/L soaping agent D-301 at 95° C. for 7 min; 4) washing with 55° C. water for 3 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 9.9, the dry rubbing fastness of level 4-5, and the wet rubbing fastness of level 3-4.

Example 13

A finishing method for reactive dye ink jet printing based on the cationic modifier ink, comprising the steps:

(1) Preparing the sizing agent;

In the total weight of the sizing agent, the sizing agent comprises 5.0 wt % sodium carbonate, 8.0 wt % sodium alginate, 18.0 wt % glycerol and deionized water as allowance.

(2) Perform sizing treatment to the cellulose fiber fabrics;

Perform sizing treatment to the fabrics by dip-padding process, make sure the liquid content in the fabrics is 100 wt %. Obtain the cellulose fiber fabrics subjected to the sizing treatment, wherein the cellulose fiber fabrics are cotton fabrics.

(3) Prepare the cationic modifier ink and the reactive dye ink;

In the total weight of the cationic modifier ink, the cationic modifier ink comprises 55.0 wt % 3-chloro-2-hydroxypropyltriethylammonium chloride, 18.0 wt % dimethylsulfoxide, 0.1 wt % sodium dodecyl sulfate, 0.1 wt % dodecyl sulfate sodium, 0.1 wt % sodium laurate and 2.0 wt % sodium carbonate and water as allowance. Uniformly mix these components according to the proportion given above, and filter through the 0.25 μm filter membrane, and obtain the cationic modifier ink. The viscosity of the obtained cationic modifier ink is 4.5 cP, and the surface tension is 55 mN/m.

The reactive dye used in the reactive dye ink is dichloromesatriazinereactive dye, wherein the weight percentage of the reactive dye is 18.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 1 min.

(5) Obtain the reactive dye ink jet printed fabrics after baking treatment and soaping. Wherein the baking treatment refers to perform baking treatment at 120° C. for 10 min. The soaping treatment includes 5 steps: 1) washing at room temperature for 3 min; 2) washing with 50° C. water for 4 min; 3) soaping with the 2 g/L soaping agent D-301 at 95° C. for 7 min; 4) washing with 55° C. water for 3 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 16.4, the dry rubbing fastness of level 5, and the wet rubbing fastness of level 4-5.

Example 14

A finishing method for reactive dye ink jet printing based on the cationic modifier ink, comprising the steps:

(1) Preparing the sizing agent;

In the total weight of the sizing agent, the sizing agent comprises 3.0 wt % sodium hydroxide, 2.0 wt % sodium alginate, 30.0 wt % glycerol and deionized water as allowance.

(2) Perform sizing treatment to the cellulose fiber fabrics;

Perform sizing treatment to the fabrics by dip-padding process, make sure the liquid content in the fabrics is 70 wt %. Obtain the cellulose fiber fabrics subjected to the sizing treatment, wherein the cellulose fiber fabrics are mixed by cotton fabrics and bast fabrics (mass ratio 1:1).

(3) Prepare the cationic modifier ink and the reactive dye ink;

In the total weight of the cationic modifier ink, the cationic modifier ink comprises 35.0 wt % 3-chloro-2-hydroxypropyltrimethylammonium chloride, 15.0 wt % ethylene glycol, 0.1 wt % OP-emulsifier, and 0.2 wt % sodium hydroxide and water as allowance. Uniformly mix these components according to the proportion given above, and filter through the 0.50 μm filter membrane, and obtain the cationic modifier ink. The viscosity of the obtained cationic modifier ink is 5.5 cP, and the surface tension is 40 mN/m.

The reactive dye used in the reactive dye ink is monochlorotriazine dye, wherein the weight percentage of the reactive dye is 18.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 1 min.

(5) Obtain the reactive dye ink jet printed fabrics after baking treatment and soaping. Wherein the baking treatment refers to perform baking treatment at 180° C. for 30 min. The soaping treatment includes 5 steps: 1) washing at room temperature for 3 min; 2) washing with 50° C. water for 1 min; 3) soaping with the 2 g/L soaping agent D-301 at 95° C. for 7 min; 4) washing with 55° C. water for 3 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 12.3, the dry rubbing fastness of level 4-5, and the wet rubbing fastness of level 4.

Example 15

A finishing method for reactive dye ink jet printing based on the cationic modifier ink, comprising the steps:

(1) Preparing the sizing agent;

In the total weight of the sizing agent, the sizing agent comprises 4.0 wt % sodium hydroxide, 5.0 wt % sodium alginate, 22.0 wt % glycerol and deionized water as allowance.

(2) Perform sizing treatment to the cellulose fiber fabrics;

Perform sizing treatment to the fabrics by dip-padding process, make sure the liquid content in the fabrics is 60 wt %. Obtain the cellulose fiber fabrics subjected to the sizing treatment, wherein the cellulose fiber fabrics are modal fabrics.

(3) Prepare the cationic modifier ink and the reactive dye ink;

In the total weight of the cationic modifier ink, the cationic modifier ink comprises 15.0 wt % 3-chloro-2-hydroxypropyltrimethylammonium chloride, 16.0 wt % ethylene glycol, 3.0 wt % tween-80, 0.2 wt % sodium bicarbonate, 0.2 wt % carbonic acid Sodium pH adjuster and 0.2 wt % dehydroacetic acid and water as allowance. Uniformly mix these components according to the proportion given above, and filter through the 0.10 μm filter membrane, and obtain the cationic modifier ink. The viscosity of the obtained cationic modifier ink is 6.5 cP, and the surface tension is 60 mN/m.

The reactive dye used in the reactive dye ink is dichloromesatriazine dye, wherein the weight percentage of the reactive dye is 12.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 1 min.

(5) Obtain the reactive dye ink jet printed fabrics after baking treatment and soaping. Wherein the baking treatment refers to perform baking treatment at 180° C. for 30 min. The soaping treatment includes 5 steps: 1) washing at room temperature for 1 min; 2) washing with 40° C. water for 1 min; 3) soaping with the 1 g/L soaping agent D-301 at 90° C. for 5 min; 4) washing with 40° C. water for 1 min; 5) washing at room temperature for 1 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 11.5, the dry rubbing fastness of level 4, and the wet rubbing fastness of level 3-4.

Example 16

A finishing method for reactive dye ink jet printing based on the cationic modifier ink, comprising the steps:

(1) Preparing the sizing agent;

In the total weight of the sizing agent, the sizing agent comprises 2.5 wt % sodium hydroxide, 0.5 wt % sodium bicarbonate, 4.0 wt % sodium alginate, 2.0 wt % starch, 25.0 wt % polyethylene glycol and deionized water as allowance.

(2) Perform sizing treatment to the cellulose fiber fabrics;

Perform sizing treatment to the fabrics by dip-padding process, make sure the liquid content in the fabrics is 80 wt %. Obtain the cellulose fiber fabrics subjected to the sizing treatment, wherein the cellulose fiber fabrics are viscose fabrics.

(3) Prepare the cationic modifier ink and the reactive dye ink;

In the total weight of the cationic modifier ink, the cationic modifier ink comprises 40.0 wt % 2,3-epoxypropyltrimethylammonium chloride, 15.0 wt % ethylene glycol, 3.0 wt % tween-80, 0.2 wt % monoethanolamine, 0.2 wt % diethanolamine, and 0.2 wt % triethanolamine and water as allowance. Uniformly mix these components according to the proportion given above, and filter through the 0.50 μm filter membrane, and obtain the cationic modifier ink. The viscosity of the obtained cationic modifier ink is 5 cP, and the surface tension is 40 mN/m.

The reactive dye used in the reactive dye ink is vinyl sulfonedye, wherein the weight percentage of the reactive dye is 20.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 100° C. for 10 min. The soaping treatment includes 5 steps: 1) washing at room temperature for 5 min; 2) washing with 60° C. water for 5 min; 3) soaping with the 4 g/L soaping agent D-301 at 98° C. for 10 min; 4) washing with 60° C. water for 5 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 17.3, the dry rubbing fastness of level 5, and the wet rubbing fastness of level 4-5.

Example 17

A finishing method for reactive dye ink jet printing based on the cationic modifier ink, comprising the steps:

(1) Preparing the sizing agent;

In the total weight of the sizing agent, the sizing agent comprises 1.0 wt % sodium hydroxide, 1.0 wt % sodium bicarbonate, 1.0 wt % sodium carbonate, 2.0 wt % sodium alginate, 2.0 wt % starch, 2.0 wt % guar gum, 25.0 wt % glycerol and deionized water as allowance.

(2) Perform sizing treatment to the cellulose fiber fabrics;

Perform sizing treatment to the fabrics by dip-padding process, make sure the liquid content in the fabrics is 80 wt %. Obtain the cellulose fiber fabrics subjected to the sizing treatment, wherein the cellulose fiber fabrics are modal fabrics.

(3) Prepare the cationic modifier ink and the reactive dye ink;

In the total weight of the cationic modifier ink, the cationic modifier ink comprises 6.0 wt % 2,3-epoxypropyltrimethylammonium chloride, 15 wt % triethylene glycol, 3.0 wt % cetyltrimethylammonium bromide and water as allowance. Uniformly mix these components according to the proportion given above, and filter through the 0.40 µm filter membrane, and obtain the cationic modifier ink. The viscosity of the obtained cationic modifier ink is 7.2 cP, and the surface tension is 53 mN/m.

The reactive dye used in the reactive dye ink is vinyl sulfonedye, wherein the weight percentage of the reactive dye is 16.0%.

(4) Use the ink jet print method to ink jet print the cationic modifier ink and the reactive dye ink on the pattern area of the cellulose fiber fabrics after being subjected to the sizing treatment. The time span of ink jet printing the cationic modifier ink and the reactive dye ink is 2 min.

(5) Obtain the reactive dye ink jet printed fabrics after baking treatment and soaping. Wherein the baking treatment refers to perform baking treatment at 100° C. for 1 min. The soaping treatment includes 5 steps: 1) washing at room temperature for 5 min; 2) washing with 60° C. water for 5 min; 3) soaping with the 4 g/L soaping agent D-301 at 98° C. for 10 min; 4) washing with 60° C. water for 5 min; 5) washing at room temperature for 5 min.

Use DataColor tester to test K/S value (K/S value refers to the colour strength value of the fabrics) of the cotton fabrics obtained after being subjected to these treatments. Then test the washing fastness and the rubbing fastness. The test results show that the reactive dye ink jet printed fabrics have the K/S value of 7.9, the dry rubbing fastness of level 3-4, and the wet rubbing fastness of level 3.

What is claimed is:

1. A finishing method for reactive dye inkjet printing based on a cationic modifier ink, comprising:
   inkjet printing the cationic modifier ink and a reactive dye ink in one step onto a pattern area of a cellulose fiber fabric subjected to a sizing treatment by an inkjet printing method to obtain a printed cellulose fiber fabric; and performing a steaming treatment or a baking treatment on the printed cellulose fiber fabric to obtain a reactive dye inkjet fabric; wherein
   a timespan of the inkjet printing the cationic modifier ink and inkjet printing the reactive dye ink is 0-2 min;
   the cationic modifier ink is an ink containing 1.0 wt %-60.0 wt % of a cationic modifier;
   the cationic modifier is one selected from the group consisting of 2,3-epoxypropyltrimethylammonium chloride, 2,3-epoxypropyltriethylammonium chloride, 3-chloro-2-hydroxypropyltrimethylammonium chloride, 3-chloro-2-hydroxypropyltriethylammonium chloride, monochlorotriazine-type quaternary ammonium salt compound, azetidine cation compound, and choline chloride; and
   a reactive dye used in the reactive dye ink is monochlorotriazine, dichloromestriazine, or a vinylsulfone type reactive dye.

2. The finishing method of claim 1, wherein the sizing treatment comprises: dipping and rolling the cellulose fiber fabric with a liquid content in the cellulose fiber fabric being 60 wt %-100 wt % to obtain a rolled cellulose fiber fabric, and drying the rolled cellulose fiber fabric to obtain a sized cellulose fiber fabric; wherein the cellulose fiber fabric is one selected from the group consisting of cotton fabrics, bast, viscose, tenel, and modal fiber.

3. The finishing method of claim 2, wherein the sizing treatment comprises 1.0 wt %-10.0 wt % of a base agent, 1.0 wt %-10.0 wt % of a thickener, 1.0 wt %-40.0 wt % of a hygroscopic agent, and deionized water as allowance;
   the base agent is at least one selected from the group consisting of sodium hydroxide, sodium bicarbonate, and sodium carbonate;
   the thickener is at least one selected from the group consisting of sodium alginate, starch, guar gum, and polyacrylic acid polymer type synthesis paste; and
   the hygroscopic agent is at least one selected from the group consisting of glycerol, urea, and polyethylene glycol.

4. The finishing method of claim 1, wherein the cationic modifier ink has a viscosity of 1-10 cP, and a surface tension of 30-66 mN/m; the cationic modifier ink is filtered through a 0.10-0.50 µm filter membrane after being mixed uniformly according to a component proportion.

5. The finishing method of claim 1, wherein the cationic modifier ink comprises: 5.0 wt %-10.0 wt % of a viscosity regulator wt %, 0.1 wt %-3.0 wt % of a surface tension regulator, 0 wt %-2.0 wt % of a pH regulator, 0 wt %-2.0 wt % of a fungicide, and water as allowance.

6. The finishing method of claim 5, wherein the viscosity regulator is at least one selected from the group consisting of glycerol, 1,2-propanediol, dimethyl sulfoxide, triethylene glycol, ethylene glycol, diethylene glycol ether, and polyethylene glycol 1000; the surface tension regulator is at least one selected from the group consisting of sodium dodecylsulfonate, sodium lauryl sulfate, sodium stearate, sodium laurate, cetyltrimethylammonium bromide, dodecyltrimethylammonium bromide, OP-emulsifier and tween-80.

7. The finishing method of claim 5, wherein the pH regulator is at least one selected from the group consisting of hydrochloric acid, sulfuric acid, citric acid, monoethanolamine, diethanolamine, triethanolamine, dipotassium hydrogen phosphate, potassium dihydrogen phosphate, disodium hydrogen phosphate, sodium dihydrogen phosphate, sodium bicarbonate, sodium carbonate, and sodium hydroxide; the fungicide is at least one selected from the group consisting of benzoic acid, potassium sorbate, dehydroacetic acid, and sodium lactate.

8. The finishing method of claim 1, wherein a weight percentage of the reactive dye in the reactive dye ink is 5.0%-20.0%.

9. The finishing method of claim 1, wherein the steaming treatment comprises steaming with saturated steam at 100° C.–180° C. for 1-30 min, and the baking treatment comprises baking at 100° C.–180° C. for 6-30 min.

* * * * *